(12) United States Patent
Sasaki et al.

(10) Patent No.: US 8,251,010 B2
(45) Date of Patent: Aug. 28, 2012

(54) MASKING MATERIAL FOR PAINTING

(75) Inventors: Takeshi Sasaki, Hiroshima (JP); Hideyuki Kurashima, Iwata (JP)

(73) Assignee: Yamato Co,. Ltd, Tokyo (JP)

( * ) Notice: Subject to any disclaimer, the term of this patent is extended or adjusted under 35 U.S.C. 154(b) by 695 days.

(21) Appl. No.: 11/989,583

(22) PCT Filed: Jul. 5, 2006

(86) PCT No.: PCT/JP2006/313406
§ 371 (c)(1),
(2), (4) Date: Jan. 28, 2008

(87) PCT Pub. No.: WO2007/013271
PCT Pub. Date: Feb. 1, 2007

(65) Prior Publication Data
US 2010/0212586 A1  Aug. 26, 2010

(30) Foreign Application Priority Data
Jul. 29, 2005  (JP) .................. 2005-221261

(51) Int. Cl.
*B05C 11/11* (2006.01)
*B60J 11/00* (2006.01)
*B32B 3/00* (2006.01)
*B05D 1/32* (2006.01)
*B65D 85/00* (2006.01)

(52) U.S. Cl. .......... 118/505; 280/770; 150/166; 428/57; 427/282

(58) Field of Classification Search .................. 118/504, 118/505; 101/128; 427/282; 280/770; 428/57; 150/166
See application file for complete search history.

(56) References Cited

U.S. PATENT DOCUMENTS

| | | | | |
|---|---|---|---|---|
| 2,040,988 A | | 5/1936 | Gragg | |
| 2,438,828 A | * | 3/1948 | Sims | 101/127 |
| 2,520,567 A | * | 8/1950 | Schleif | 101/128 |
| 2,959,152 A | * | 11/1960 | Byers et al. | 118/505 |
| 3,837,949 A | * | 9/1974 | Eckart, Jr. | 156/71 |
| 3,854,448 A | * | 12/1974 | Kromanaker | 118/505 |
| 4,129,669 A | * | 12/1978 | Lopez | 427/282 |
| 4,430,137 A | * | 2/1984 | Jones | 156/247 |
| 4,550,048 A | * | 10/1985 | Nakagawa | 428/138 |
| 5,127,974 A | * | 7/1992 | Tomiyama et al. | 156/85 |
| 5,144,736 A | * | 9/1992 | Hanson | 29/403.1 |
| 5,193,877 A | * | 3/1993 | George, Jr. | 296/136.1 |
| 5,294,278 A | * | 3/1994 | Matsui et al. | 156/248 |
| 5,631,055 A | * | 5/1997 | Vines et al. | 428/40.1 |
| 5,882,788 A | * | 3/1999 | Raley | 428/343 |
| 5,935,669 A | * | 8/1999 | Leeuwenburgh | 428/40.1 |

(Continued)

FOREIGN PATENT DOCUMENTS
FR  2 639 261 A  5/1990
(Continued)

*Primary Examiner* — Dah-Wei Yuan
*Assistant Examiner* — K Kurple
(74) *Attorney, Agent, or Firm* — Birch, Stewart, Kolasch & Birch, LLP (57) ABSTRACT

The present invention is a masking material for painting for masking a surface to be unpainted, comprising: a masking material body for painting made of a carton having a shape conformed to the surface to be unpainted; a double-sided tape provided on the whole rear surface of the masking material body for painting; an incision formed in both the masking material body for painting and the double-sided tape; and a piece of thin paper that covers the incision.

8 Claims, 5 Drawing Sheets

U.S. PATENT DOCUMENTS

| | | | | |
|---|---|---|---|---|
| 5,975,621 | A * | 11/1999 | Lefevre | 296/136.07 |
| 6,000,346 | A * | 12/1999 | Pajerski et al. | 108/158.11 |
| 6,142,071 | A * | 11/2000 | Fexer | 101/128 |
| 6,316,021 | B1 * | 11/2001 | Gueret | 424/443 |
| 6,547,313 | B2 * | 4/2003 | Syron | 118/505 |
| 6,572,949 | B1 * | 6/2003 | Lewis et al. | 428/99 |
| 6,579,587 | B2 * | 6/2003 | Schnoebelen, Jr. | 428/40.1 |
| 6,723,406 | B2 * | 4/2004 | Nickel | 428/40.1 |
| 6,820,546 | B2 * | 11/2004 | Wynne | 101/129 |
| 7,022,188 | B2 * | 4/2006 | Ganci | 428/131 |
| 2002/0029499 | A1 * | 3/2002 | Volkert | 40/124.08 |
| 2002/0178953 | A1 * | 12/2002 | Cacchi | 101/485 |
| 2006/0045973 | A1 * | 3/2006 | Hann | 427/282 |
| 2007/0141260 | A1 * | 6/2007 | Syron | 427/282 |
| 2008/0149253 | A1 * | 6/2008 | Schivley | 156/71 |

FOREIGN PATENT DOCUMENTS

| | | |
|---|---|---|
| JP | 61-872 U | 1/1986 |
| JP | 8-024773 A | 1/1996 |
| JP | 2000-5663 A | 1/2000 |

* cited by examiner

MASKING MATERIAL FOR PAINTING

FIELD OF THE INVENTION

The present invention relates to a masking material for painting, that is used for masking a surface to be unpainted (surface which is not to be painted), when a bumper or the like of an automobile is painted.

BACKGROUND ART

For example, when an automobile bumper made of a resin is painted with a paint of a vehicle color, an air intake port of the bumper is masked for preventing an application of the paint thereto, and then the bumper is painted. Thus, the masked part remains to be unpainted.

As an example of such a masking method, a use of a synthetic resin sheet formed by molding a thermoplastic resin or the like into a predetermined shape has been known (see, JP8-24773A, for example). The synthetic resin sheet is previously molded into a shape conformed to a predetermined part (part to be masked) of a surface to be unpainted, by a vacuum molding, press molding, blow molding, and so on.

Since the conventional masking material for painting is easily fixed on a part to be masked, a time required for the masking operation is short enough.

SUMMARY OF THE INVENTION

However, the conventional masking material for painting does not always firmly adhere to an object to be painted. Thus, a boundary line between a surface to be painted and a surface to be masked (surface to be unpainted), i.e., a parting line for painting may be displaced from a proper position, or may become vague. This invites a deterioration in painting quality. In addition, when the conventional masking material for painting is disposed of, regulations concerning a disposal thereof (e.g., incineration regulation for plastic wastes) have to be taken into consideration.

There is a further problem in that a masking material for painting, which has been manufactured by subjecting a synthetic resin sheet to an orientation molding process such as a vacuum molding process, is liable to be shrunk and deformed by a cooling process succeeding the molding process.

The present invention has been made in view of the above circumstances. The object of the present invention is to provide a masking material for painting, which is formed into a shape conformed to a surface to be unpainted, that is capable of favorably adhering to a complicatedly curved surface to be unpainted (having an improved follow-up property for a complicatedly curved surface to be unpainted) so as to enhance a painting quality of a parting line after a baking finish process, while the masking material for painting is capable of being incinerated as a non-industrial waste.

The present invention is a masking material for painting for masking a surface to be unpainted, comprising: a masking material body for painting made of a carton having a shape conformed to the surface to be unpainted; a double-sided tape provided on a rear surface of the masking material body for painting; an incision formed in both the masking material body for painting and the double-sided tape; and a piece of thin paper that covers the incision.

According to the present invention, since the masking material body for painting is made of a carton having a shape conformed to (a shape of) the surface to be unpainted, the masking material for painting can be readily fixed on the surface to be unpainted (part to be masked), and thus a time required for the fixing operation can be saved. In addition to this good working efficiency, the masking material for painting according to the present invention can be incinerated as a non-industrial waste.

Further, according to the present invention, a double-sided tape is provided on the whole rear surface of the masking material body for painting made of a carton. That is, a double-sided tape is totally or partially applied to the rear surface (surface to be applied to an object to be painted) of the carton. Thus, the carton can have a substantially uniform firmness, which facilitates a handling of the masking material for painting.

It is preferable to remove a lining strip of a predetermined width from the double-sided tape, the lining strip being positioned on a part corresponding to a parting line for painting (outer peripheral part of the masking material body for painting). Thus, an adhesive surface, by which the masking material for painting and a part to be masked are adhesively applied to each other, can be simply formed. For this purpose, the liner strip of the double-sided tape positioned on a part corresponding to a parting line for painting preferably has a score in accordance with the predetermined width.

Generally, the carton and the double-sided tape can be adhered to each other very well, and the carton to which the double-sided tape is applied has an excellent flexibility. Thus, it is easy to handle the masking material for painting according to the present invention, because the masking material body for painting and the double-sided tape are hardly separated from each other. At the same time, the masking material for painting according to the present invention facilitates a masking operation. For example, when a conventional masking material for painting made of a synthetic resin is adhesively applied to a part to be masked, it is necessary to reinforce the adhesive application with an additional adhesive tape, with a view to enhancing a painting quality of a parting line for painting. However, such a reinforcement is not required for the masking material for painting according to the present invention.

As described above, the present invention uses a carton as a material of the masking material body for painting, so as to ensure rigidity for maintaining a posture thereof while, at least, it is applied to a part to be masked (rigidity for retaining a certain shape thereof conformed to a shape of a surface to be unpainted). For this reason, the masking material body for painting has a relatively larger firmness. However, when a part to be masked is a curved surface, an excessively large firmness of the masking material body for painting may undesirably increase a repulsive force of the carton based on torsion and deflection, depending on a degree of curving of the curved surface. That is, the repulsive force may result in float or separation of the masking material for painting from the part to be masked, which makes it impossible to keep the tight adhesion of the masking material for painting to the object to be painted.

In order to prevent this situation, an incision is formed in the masking material for painting (and the double-sided tape) in the present invention. Due to the provision of this incision, a firmness of the masking material for painting can be weakened. Thus, it is possible to prevent the float or separation of the masking material for painting from the part to be masked.

Moreover, the incision enables the masking material for painting to be bent. Since the masking material for painting can be bent by the incision, the masking material for painting can be securely adhered to an object to be painted, even when a degree of curving of a curved surface to be unpainted is relatively large. Namely, even when a shape of a surface to be unpainted is complicatedly curved, difficulty in adhesively applying the masking material for painting to such a curved part is alleviated (a follow-up property for a curved surface is improved). Thus, a painting quality of a parting line after a baking finish process can be elevated.

Furthermore, according to the present invention, since the incision is covered by a piece of thin paper such as a paper masking tape, it can be reliably prevented that a paint mist intrudes a part to be masked through the incision.

In another embodiment of the present invention, a masking material body for painting may include two continuous surface parts that are continuously connected to each other in a bending manner.

In this case, it is preferable that an opening be formed in at least one of the two continuous surface parts, and that the opening be covered by the piece of thin paper.

For example, when an automobile bumper is painted, there is a case wherein an air intake port in which a step has been formed is a surface to be unpainted. In this case, a masking material body for painting made of a carton has preferably two continuous surface parts that are continuously connected to each other in a bending manner in three dimensions (stereoscopically). This is because, in view of a working efficiency of a masking operation, the smaller number of components of the masking material for painting is preferred, even when a shape of a surface to be unpainted is complicated.

However, a structure formed by bending a carton in three dimensions to provide continuous surface parts is prone to be excessively rigid relative to torsion or the like. For example, a resin automobile bumper as an object to be painted is easily deformed by a heating process during a painting step. Further, it often occurs that the bumper is deformed by an abrupt twisting force applied thereto during a transportation thereof. If such an unexpected deformation of the object to be painted caused by an external force takes place during a masking operation or the like, the masking material for painting provided with continuous surface parts that are continuously connected to each other in a bending manner may not sufficiently follow the deformation of the object to be painted because of its rigid structure. As a result, there is a possibility that the masking material for painting is separated from the part to be masked.

In preventing this situation, it is effective to form an opening in at least one of the two continuous surface parts and to cover the opening by a piece of thin paper. The provision of the opening with reduced rigidity can promote a deformation of the masking material for painting. Therefore, even if an object to be painted is deformed by an external force during a masking operation, it can be avoided to a considerable extent that the masking material for painting is separated from the part to be masked.

In addition, since the opening is covered by a piece of thin paper such as a paper masking tape, it can be reliably prevented that a paint mist intrudes a part to be masked through the opening.

PREFERRED EMBODIMENTS OF THE INVENTION

Embodiments of the present invention will be described below with reference to the accompanying drawings.
(First Embodiment)

A first embodiment of the present invention described referring to FIGS. 1 to 4 is a masking material for painting to be used for masking an air intake port of an automobile bumper. In this embodiment, the masking material for painting is not bent but only curved.

Figure 1:
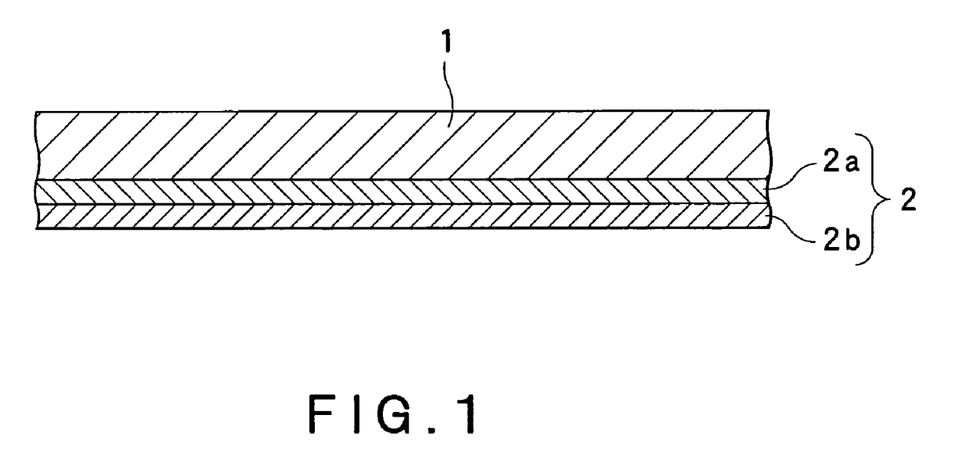
FIG. 1 is a sectional view of a masking material for painting in a first embodiment according to the present invention.

FIG. 1 is a sectional view of the masking material for painting in the first embodiment of the present invention. The masking material body for painting 1 is made of a carton. A double-sided tape 2 is adhesively applied to the whole rear surface of the masking material body for painting 1, that is, the whole surface to be applied to an object to be painted.

The carton used as the masking material body for painting 1 should have rigidity for maintaining a posture thereof while, at least, it is applied to a part to be masked, namely, rigidity for retaining a certain shape thereof conformed to (a shape of) a surface to be unpainted. In addition, for the purpose of saving cost required for mass consumption of the masking material for painting, it is preferable that the masking material for painting be repeatedly used a plurality of times. It is desired that the masking material for painting be used about five times.

When priority is given to cost, a pasteboard made of waste paper (salvage paper) is preferred for making the carton satisfying the above conditions. However, when the pasteboard is used, delamination between layers in the pasteboard is likely to occur when it is removed from a part to be masked after a painting process. This disadvantageously affects a subsequent use of the masking material for painting.

Thus, an experiment was conducted by using a white paperboard made of a virgin pulp. Then, a satisfactory result was obtained in that delamination between layers scarcely occurred and the paperboard had a moderate "suppleness".

When a thickness and a firmness of a paperboard are expressed by a basis weight, a satisfactory result was obtained in this embodiment when a white paperboard (manufactured by Nippon Daishowa Paperboard, Co., Ltd., trade name) was used, whose basis weight is 320 g/m$^2$. However, it seems that suitable degrees of thickness and firmness of a paperboard depend on a shape and/or size of a part to be masked, i.e., a part to be unpainted.

The double-sided tape 2 has preferably the following properties. That is, the double-sided tape 2 has an excellent adhesiveness even when a surface area thereof is small; when it is removed, the double-sided tape 2 leaves no paste; and the double-sided tape 2 has an excellent follow-up property for a curved surface, and a heat resistance. (See sides 2a and 2b in FIG. 1.) In this embodiment, the double-sided tape for industrial use (manufactured by Sony Chemical Kabushiki Kaisha, trade name) was used.

Figure 2:
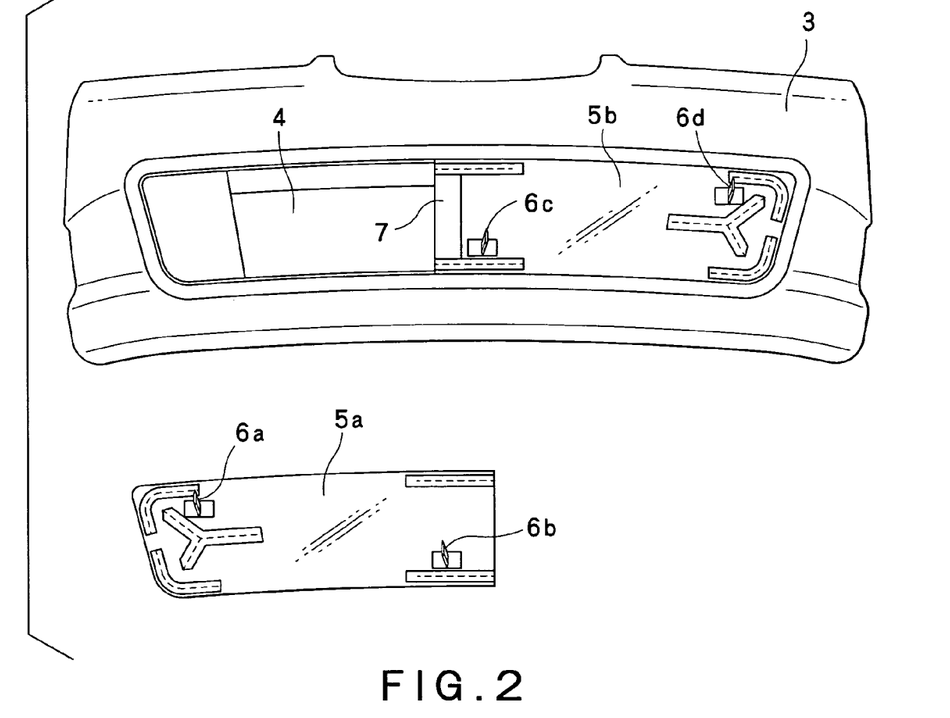
FIG. 2 is a schematic view showing a situation wherein the masking material for painting shown in FIG. 1 is fixed on an air intake port of an automobile bumper.

FIG. 2 is a schematic view showing a situation wherein the masking material for painting of FIG. 1 is fixed on an air intake port 4 of an automobile bumper 3. In this embodiment, two members, i.e., a right-side masking material for painting 5a and a left-side masking material for painting 5b, are prepared as a masking material for painting 5. At a masking step, the masking materials 5a and 5b are overlapped with each other at a center part.

This overlapping structure is a countermeasure against a displacement (dislocation) of a parting line for painting, which is caused by the following reason. That is, when the resin automobile bumper and the paper masking material for painting are allowed to pass through a drying oven (110° C./60 minutes) after they are painted, the resin automobile bumper and the paper masking material for painting are shrunk by heat. Because of difference in thermal shrinkage percentages of them (resin and paper), the parting line for painting is displaced. Thus, in order to avoid this situation, by longitudinally dividing the masking material for painting to reduce a shrinkage amount thereof, and by overlapping the right-side and left-side masking materials for painting 5a and 5b with each other at the center part, the overlapped portion can absorb deformation caused by shrinkage and/or expansion. In order to prevent that an adhesive of the double-sided tape on the rear surface of the masking material for painting to be positioned on an upper side of the overlapped portion adheres to a front surface of the masking material for painting to be positioned on a lower side of the overlapped portion, a polypropylene tape 7 is preferably applied to the front surface of the latter masking material for painting.

Tabs 6a, 6b, 6c, 6d are disposed on the front surfaces of the respective masking materials for painting 5a and 5b. By means of the tabs 6, the masking materials for painting 5a and 5b are removed from a part to be masked. Each of the tabs 6a, 6b, 6c, 6d is formed of a carton piece surrounded by a masking tape, and is attached to each masking material for painting 5a and 5b in such a manner that each of the tabs 6a, 6b, 6c, 6d can be folded.

Figure 3:
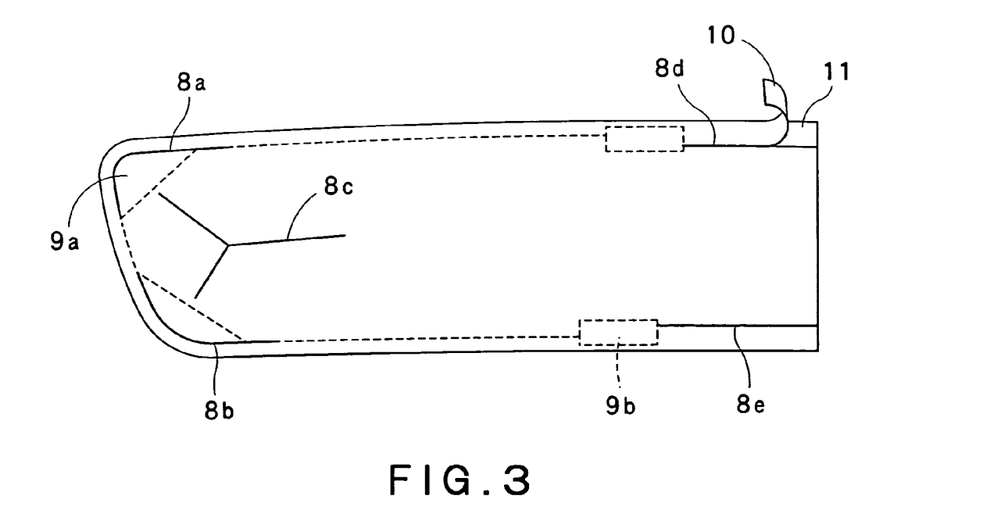
FIG. 3 is a schematic view of a rear surface of the masking material for painting shown in FIG. 1.

FIG. 3 is a schematic view of the rear surface (surface provided with the double-sided tape) of the masking material for painting of this embodiment. In FIG. 3, the solid lines indicate cut lines formed by punching. The dotted lines indicate half-cut lines. The cut lines 8a, 8b, 8c, 8d, and 8e in FIG. 3 are incisions for decreasing a firmness of the (carton) masking material body for painting 1. Positions and lengths of the incisions (where and how the incisions are formed) are previously examined and determined by using a trial piece or the like. For example, a trial piece with no incision is put on a part to be masked, and an outer peripheral portion of the trial piece is closely applied to the part to be masked. By forming an incision little by little in a largely deflected part of the carton, a proper position and length thereof can be determined.

The cut lines and the half-cut lines are continuously formed along an outer peripheral edge functioning as a parting line for painting, with leaving a space of a predetermined width from the outer peripheral edge. When a peeling strip 10 of the predetermined width is peeled off from the double-sided tape with the use of the cut lines and the half-cut lines, a circumferential adhesive 11 of the double-sided tape is exposed. The circumferential adhesive 11 is used for adhesively applying the masking material for painting to the part to be masked.

In order to further facilitate a fixing operation of the masking material for painting on the object to be painted, a positioning member can be made of a corrugated cardboard or the like and can be used. For example, by peeling off the peeling strips from the double-sided tape at application portions 9a and 9b, positioning members are secured thereon by adhesive of the double-sided tape at the application portions 9a and 9b.

Figure 4:
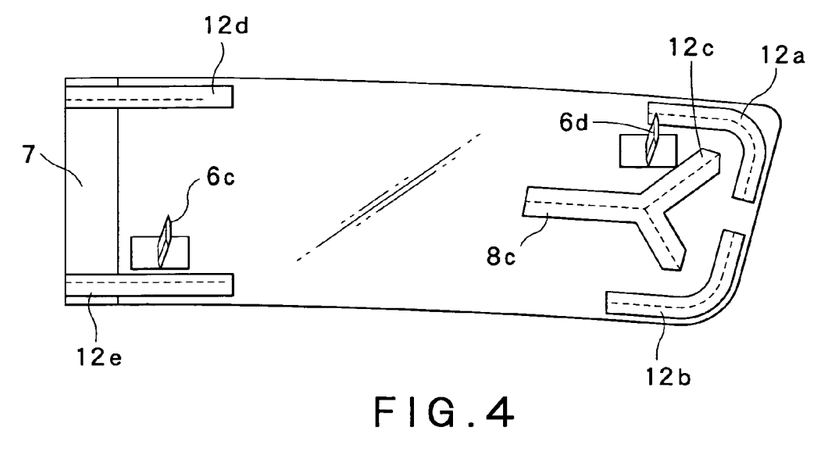
FIG. 4 is a schematic view of a front surface of the masking material for painting shown in FIG. 1.

FIG. 4 is a schematic view of the front surface of the masking material for painting of the present embodiment. In FIG. 4, the dotted lines are hidden lines that depict incisions 8. Masking tapes 12a, 12b, 12c, 12d, 12e formed of thin paper are applied to cover the respective incisions 8. When the curved masking tapes 12a and 12b, and the Y-shaped masking tape 12c are previously prepared by punching, a working efficiency can be raised.

(Effect of First Embodiment)

A use of the masking material for painting in the first embodiment is described with reference to FIG. 2.

At first, with holding the tabs 6c and 6d, the masking material for painting 5b for the left-side of the bumper is placed in position relative to the air inlet port 4 of the automobile bumper 3 using the positioning members disposed on the rear surface of the masking material 5b. By pressing an outer periphery of the masking material for painting 5b by hand, the masking material for painting 5b is fixedly applied to the air intake port 4.

Then, with holding the tabs 6a and 6b, the masking material for painting 5a for the right-side of the bumper is placed in position relative to the air inlet port 4 of the automobile bumper 3 using the positioning members disposed on the rear surface of the masking material 5a. At this time, a right end portion of the masking material for painting 5a is laid above the polypropylene tape 7 that has been attached to a left end portion of the masking material for painting 5b, so that the masking materials 5a and 5b are overlapped with each other. Thereafter, by pressing an outer periphery of the masking material 5a by hand, the masking material for painting 5a is fixedly applied to the air intake port 4.

Although not shown, a rear surface of the bumper is covered with a lid formed of a cardboard or the like. Thus, a penetration of a painting mist from the rear surface of the bumper can be prevented.

A paint is applied under the above-described masked state. Then, the automobile bumper 3 and the masking materials for painting 5a and 5b are allowed to pass through a drying oven. After the paint is dried, the right-side masking material for painting 5a is detached with holding the tabs 6a and 6b, then the left-side masking material for painting 5b is detached with holding the tapes 6c and 6d, and finally the lid covering the rear surface of the bumper is detached. In this manner, a series of masking painting operations is completed. Following thereto, the masking painting operation is repeated.

(Second Embodiment)

A second embodiment of the present invention described referring to FIGS. 5 to 8 is also a masking material for painting to be used for masking an air inlet port of an automobile bumper. However, the masking material for painting in the second embodiment is designed for a case wherein a shape of a part to be masked of an air intake port of an automobile bumper includes surfaces of different depths. A (carton) masking material body for painting is assembled in three dimensions to have two continuous surface parts that are continuously connected to each other in a bending manner.

Figure 5:
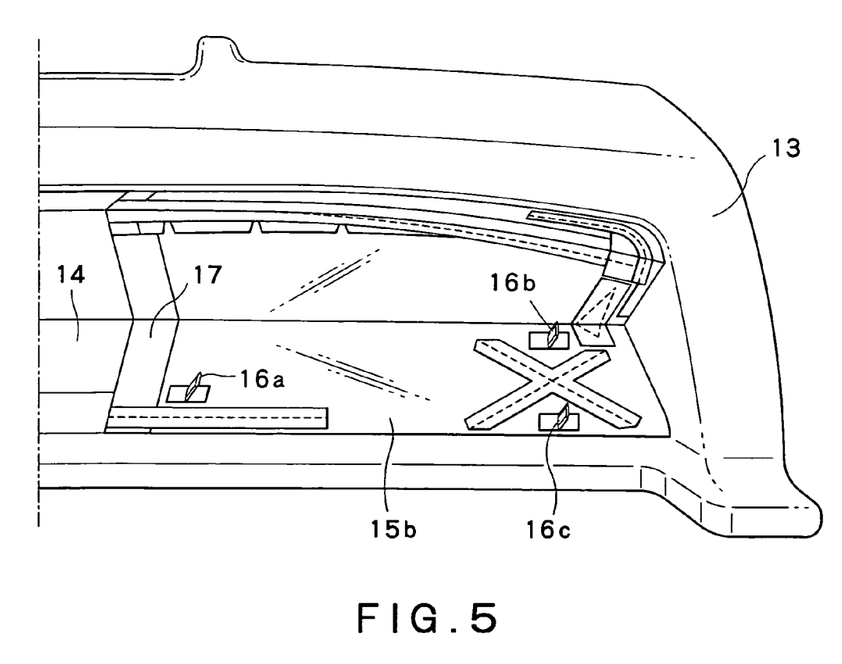
FIG. 5 is a schematic view showing a situation in which a masking material for painting in a second embodiment according to the present invention is fixed on an air intake port of an automobile bumper.

FIG. 5 is a schematic view showing a situation wherein the masking material for painting in the second embodiment of the present invention is fixed on an air intake port 14 of an automobile bumper 13.

Also in this embodiment, two members, i.e., a right-side masking material for painting (not shown) and a left-side masking material for painting 15b, are prepared as a masking material for painting 15. At a masking step, the masking materials for painting are overlapped with each other at a center part. In order to prevent that an adhesive of the double-sided tape on a rear surface of the masking material for painting to be positioned on an upper side of the overlapped portion adheres to a front surface of the masking material for painting to be positioned on a lower side of the overlapped portion, a polypropylene tape 17 is applied to the front surface of the latter masking material for painting. Tabs 16a, 16b, 16c are disposed on the front surfaces of the respective masking materials for painting. By means of the tabs 16a, 16b, 16c, the masking materials for painting are removed from a part to be masked.

Figure 6:
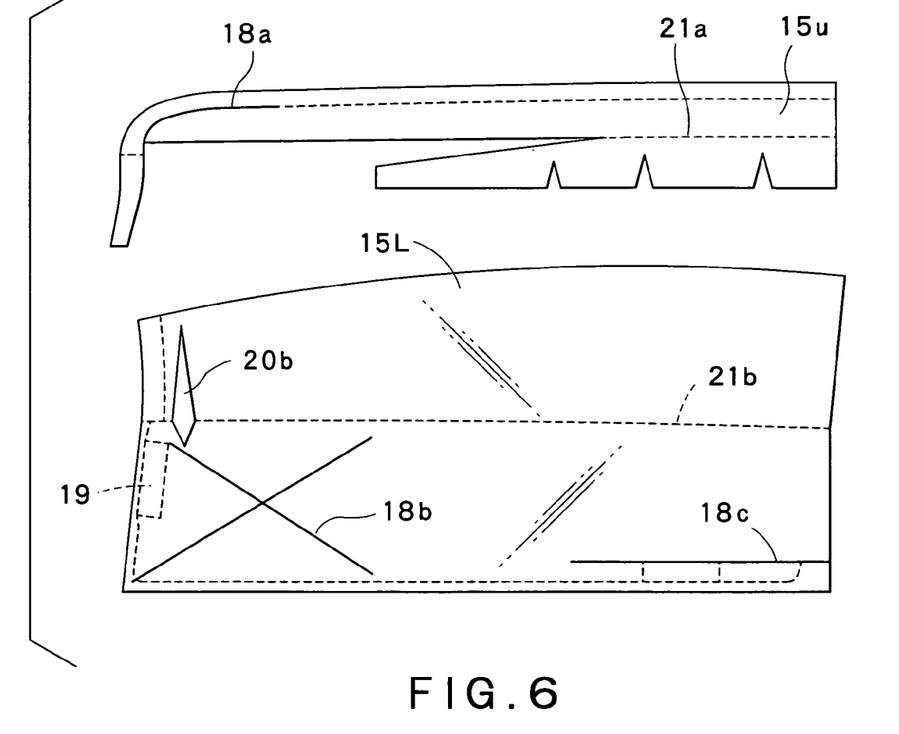
FIG. 6 is a schematic view of a rear surface of the masking material for painting shown in FIG. 5 before it is assembled.

FIG. 6 is a schematic view of the rear surface (surface provided with a double-sided tape) of the masking material for painting in this embodiment before it is assembled. In FIG. 6, the solid lines indicate cut lines formed by punching. The dotted lines indicate half-cut lines. The cut lines 18b and 18c in FIG. 6 are incisions for decreasing a firmness of a (carton) masking material body for painting 1. Positions and lengths of the incisions (where and how the incisions are formed) are previously examined and determined by using a trial piece or the like.

Figure 7:
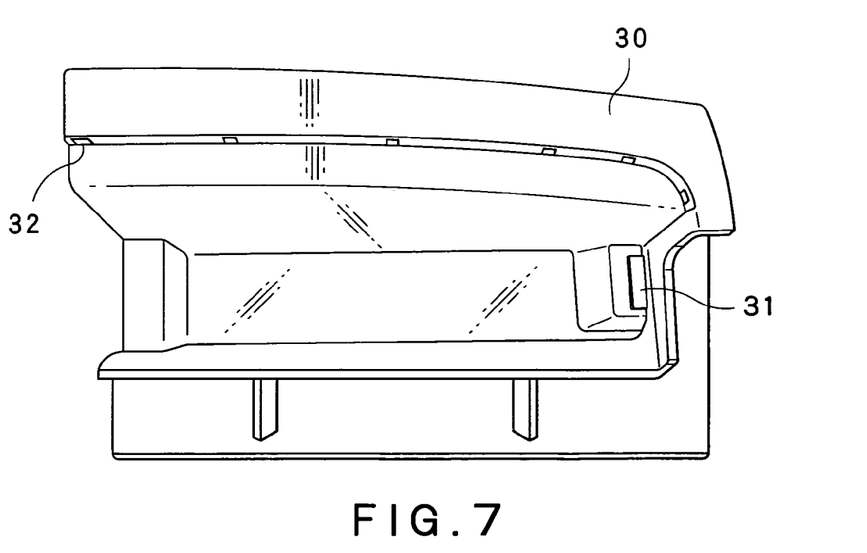
FIG. 7 is a schematic view of a jig for assembling the masking material for painting shown in FIG. 5.

In this embodiment, an upper member 15U and a lower member 15L, which are shown in FIG. 6, are assembled on a jig 30 shown in FIG. 7.

Considering a shape and a size of a part to be adhered to the automobile bumper 13, a carton for the upper member 15U in this embodiment was made by using a white paperboard having a basis weight of 320 g/m² (manufactured by Nippon Daishowa Paperboard, Co., Ltd., trade name). A double-sided tape for the upper member 15U was made by using a double-sided tape for industrial use (manufactured by Sony Chemical Kabushiki Kaisha, trade name) having an excellent initial adhesiveness and a high adhesive strength. On the other hand, giving a greater importance to a follow-up property for a curved surface, a carton for the lower member 15L was made by using a white paperboard having a basis weight of 230 g/m² (manufactured by Nippon Daishowa Paperboard, Co., Ltd., trade name). A double-sided tape for the lower member 15L was made by using a double-sided tape for industrial use (manufactured by Sony Chemical Kabushiki Kaisha, trade name) having an excellent follow-up property for a curved surface. Then, a satisfactory result could be obtained.

The cut lines and the half-cut lines are continuously formed along an outer peripheral edge functioning as a parting line for painting, with leaving a space of a predetermined width from the outer peripheral edge. When a peeling strip of the predetermined width is peeled off from the double-sided tape, with the use of the cut lines and the half-cut lines, a circumferential adhesive of the double-sided tape is exposed. The circumferential adhesive is used for adhesively applying the masking material for painting to the part to be masked. This is the same as that of the first embodiment.

In addition thereto, the circumferential adhesive is also used for temporarily securing the upper member 15U and the lower member 15L on the jig 30, when the upper and lower members 15U and 15L are assembled on the jig 30 shown in FIG. 7.

In order to further facilitate a fixing operation of the masking material for painting on the object to be painted, a positioning member can be made of a corrugated cardboard or the like and can be used. For example, the positioning member is previously placed (or temporarily secured) on a positioning member mounting part 31 of the jig 30. Then, a peeling strip of a positioning member attachment part 19 disposed on the rear surface of the lower member 15L is peeled off to expose an adhesive. Owing to this adhesive, the positioning member is fixedly attached to the positioning member attachment part 19 on the rear surface of the lower member 15L, when the upper member 15U and the lower member 15L are assembled on the jig 30.

When the upper and lower members 15U and 15L are temporarily secured on the jig 30, positions of outer peripheries of the upper and lower members 15U and 15L functioning as a parting line for painting are adjusted by means of a plurality of spacers 32 disposed on the jig 30.

Figure 8:
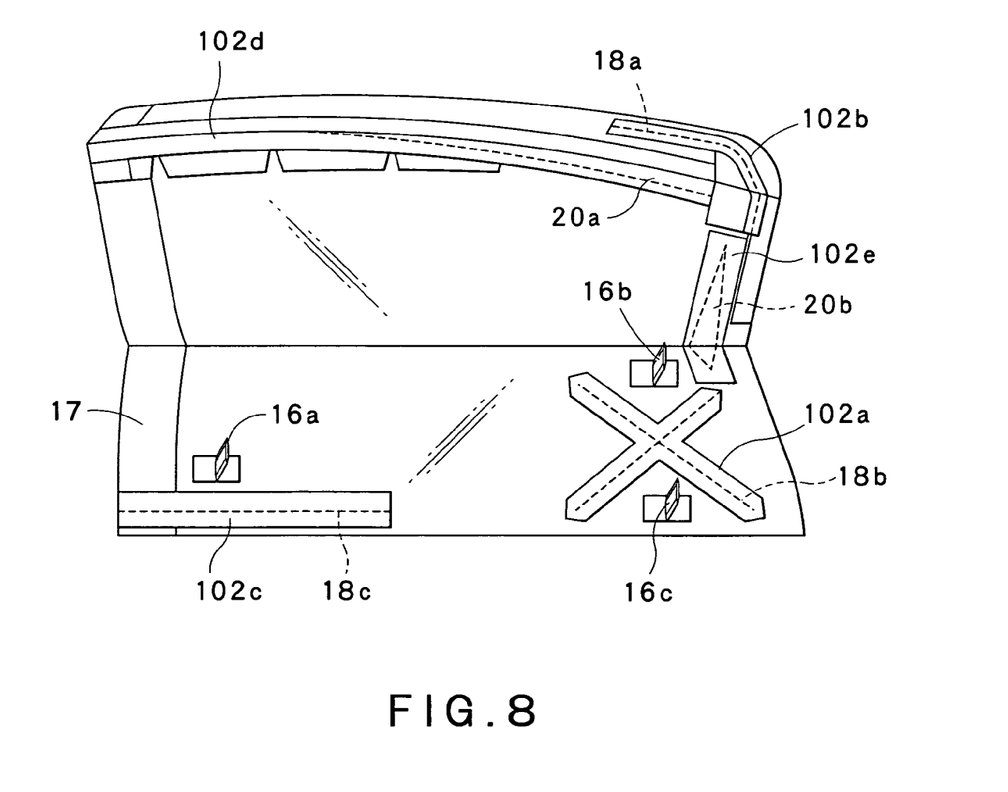
FIG. 8 is a schematic view of a front surface of the masking material for painting shown in FIG. 5.

FIG. 8 is a schematic view of the front surface of the masking material for painting in this embodiment. In FIG. 8, the dotted lines are hidden lines that depict incisions 18b, 18c and openings 20a, 20b. Masking tapes 102a, 102b, 102c, 102d, 102e formed of thin paper are applied to cover the respective incisions 18b, 18c and openings 20a, 20b. As can be seen in FIG. 8, opening 20b is formed in the two continuous surface parts and extends into portions of the continuous surface parts on opposite sides of the bending line 21b, and the thin paper 102e entirely covers the opening 20b and covers portions of the bending line 21b on opposite sides of the opening 20b. When an X-shaped masking tape 102a and a curved masking tape 102b are previously prepared by punching, a working efficiency can be raised.

As seen in FIG. 6, the upper member 15U is bent along a bending line 21a, and the lower member 15L is bent along a bending line 21b. Then, the upper member 15U and the lower member 15L are secured on the jig 30, with a gap therebetween. The gap provides an opening 20a. The opening 20a is formed in one of the two continuous surface parts that are continuously connected to each other in a bending manner. As shown in FIG. 8, an opening 20b is formed over the two continuous surface parts that are continuously connected to each other in a bending manner.

(Effect of Second Embodiment)

A use of the masking material for painting in the second embodiment is described with reference to FIG. 5.

At first, with holding the tabs 16a, 16b, 16c, the masking material for painting 15b for the left-side of the bumper is placed in position relative to the air intake port 14 of the automobile bumper 13 using the positioning member disposed on the rear surface of the lower right end portion of the masking material for painting 15b. By pressing an outer periphery of the masking material for painting 15b by hand, the masking material for painting 15b is fixedly applied to the air intake port 14.

Then, the masking material for painting for the right-side of the bumper is fixed on the air intake port 14 of the automobile bumper 13. Since this operation and subsequent operations are substantially the same as those in the first embodiment, the detailed description thereof is omitted.

When the object to be painted is deformed by an external force caused by some reason during the masking operation, the openings 20a and 20b of weakened rigidity allow (absorb) the deformation of the masking material for painting. Thus, separation of the masking material for painting from a part to be masked can be avoided.

Although the embodiments of the present invention have been described as above with reference to the drawings, the structures are not specifically limited to the above respective embodiments. Various changes and additions in design are possible, without departing from the scope of the invention recited in the respective claims.

The invention claimed is:

1. A masking material for painting, comprising:
   a masking body made of a carton having a size and shape conformed to a total shape of a masked surface;
   a double-sided tape provided on a rear surface of the masking body;

an incision formed in both the masking body and the double-sided tape, in order to weaken a firmness of the masking body in such a manner that the masking body is conformed to the total shape of the masked surface; and a piece of thin paper that covers the incision, wherein the masking body is conformed to the total shape of the masked surface due to the firmness thereof weakened by the incision, wherein the masking body is formed by a right side portion and a left side portion, each of which is planar-shaped, the right side portion has a left end that is laid above and attached to a bonding substance covering and attached to a right end of the left side portion, thereby creating a rectangular-shaped overlapping structure, wherein a quantity and extent of the bonding substance provided to form the overlapping-structure is such that, when the right and left side portions deform by different amounts when subjected to a drying heat, the overlapping structure absorbing deformation caused by shrinkage or expansion of the right and left side portions without opening up a parting line between the overlapping ends of the right and left side portions, the masking body further comprising:

a peeling strip of a predetermined width provided along a circumferential portion of a side of the double-sided tape away from the masking body, the peeling strip being removable from the double-sided tape in order to expose an adhesive on the circumferential portion of the double-side tape, and the masking body is adhesively applied to the masked surface with an adhesive on the circumferential portion of the double-sided tape.

2. A masking material for painting, comprising:

a masking body made of a carton having a size and shape conformed to a total shape of a masked surface;

a double-sided tape having a first side provided on at least a part of a rear surface of the masking body;

an incision formed in the masking body, or in both the masking body and the double-sided tape, in order to weaken a firmness of the masking body in such a manner that the masking body is conformed to the total shape of the masked surface; and a piece of thin paper that covers the incision, wherein the masking body is configured in the shape conformed to the total shape of the masked surface due to the firmness thereof weakened by the incision, wherein the masking body is formed by a first masking body and a second masking body, each of which is planar-shaped, the first masking body has a portion thereof that is laid above and attached to a bonding substance covering and attached to a portion of the second masking body, thereby creating a rectangular-shaped overlapping structure, wherein a quantity and extent of the bonding substance provided to form the overlapping-structure is such that, when the first and second masking bodies deform by different amounts when subjected to a drying heat, the overlapping structure absorbing deformation caused by shrinkage or expansion of the first and second masking bodies without opening up a parting line between the overlapping portions of the first and second masking bodies, the masking body further comprising:

a peeling strip of a predetermined width provided along a circumferential portion of the second side of the double-sided tape, the peeling strip being removable from the double-sided tape in order to expose an adhesive on the circumferential portion of the double-side tape, the masking body is adhesively applied to the masked surface with an adhesive on the circumferential portion of the double-sided tape.

3. The masking material for painting according to claim 2, wherein:

the masking body includes two continuous surface parts that are continuously connected to each other at a bending line in order to be bendable with respect to each other at the bending line;

an opening is formed in at least one of the two continuous surface parts; and the opening is entirely covered by the piece of thin paper.

4. The masking material for painting according to claim 1, wherein the incision includes full-cut lines and half-cut lines continuously formed along an outer peripheral edge of the masking body and the double-sided tape, while leaving a space of a predetermined width from the outer peripheral edge, wherein the full-cut lines and the half-cut lines of the incision continuously formed along the outer peripheral edge of the masking body are arranged alternately, with each of the full-cut lines being disposed between two of the half-cut lines, wherein an application portion is provided on the double-sided tape between at least one of the full-cut lines and one of the half-cut lines.

5. The masking material for painting according to claim 2, wherein the full-cut lines and the half-cut lines of the incision continuously formed along the outer peripheral edge of the masking body are arranged alternately, with each of the full-cut lines being disposed between two of the half-cut lines, wherein an application portion is provided on the double-sided tape between at least one of the full-cut lines and one of the half-cut lines.

6. The masking material for painting according to claim 3, wherein the opening is formed in the two continuous surface parts and extends into portions of the continuous surface parts on opposite sides of the bending line; and the thin paper entirely covers the opening and covers portions of the bending line on opposite sides of the opening.

7. The masking material for painting according to claim 1, wherein the incision includes full-cut lines and half-cut lines continuously formed along an outer peripheral edge of the masking body and the double-sided tape, while leaving a space of a predetermined width from the outer peripheral edge, and the incision includes additional full-cut lines arranged in a Y-shape or X-shape located in a central portion of masking body and the double-sided tape.

8. The masking material for painting according to claim 2, wherein the incision includes full-cut lines and half-cut lines continuously formed along an outer peripheral edge of the masking body and the double-sided tape, while leaving a space of a predetermined width from the outer peripheral edge, and the incision includes additional full-cut lines arranged in a Y-shape or X-shape located in a central portion of masking body and the double-sided tape.

* * * * *